(12) United States Patent
Ho et al.

(10) Patent No.: US 12,283,447 B2
(45) Date of Patent: Apr. 22, 2025

(54) DIRECT CURRENT CIRCUIT BREAKER AND RELATED METHOD

(71) Applicant: University of Manitoba, Winnipeg (CA)

(72) Inventors: Ngai Man Ho, Winnipeg (CA); King Man Siu, Winnipeg (CA); Dong Li, Winnipeg (CA)

(73) Assignee: Ujniversity of Manitoba, Winnipeg (CA)

( * ) Notice: Subject to any disclaimer, the term of this patent is extended or adjusted under 35 U.S.C. 154(b) by 114 days.

(21) Appl. No.: 17/782,320

(22) PCT Filed: Feb. 18, 2021

(86) PCT No.: PCT/CA2021/050175
§ 371 (c)(1),
(2) Date: Jun. 3, 2022

(87) PCT Pub. No.: WO2021/163795
PCT Pub. Date: Aug. 26, 2021

(65) Prior Publication Data
US 2023/0005676 A1  Jan. 5, 2023

Related U.S. Application Data

(60) Provisional application No. 62/977,840, filed on Feb. 18, 2020.

(51) Int. Cl.
*H01H 9/54* (2006.01)

(52) U.S. Cl.
CPC .................. *H01H 9/542* (2013.01)

(58) Field of Classification Search
CPC ....................................................... H01H 9/542
(Continued)

(56) References Cited

U.S. PATENT DOCUMENTS 8,503,138 B2   8/2013  Demetriades et al.
8,891,209 B2  11/2014  Hafner et al.
(Continued)

FOREIGN PATENT DOCUMENTS

EP         3039709       7/2016
WO      WO 2017151521   9/2017

*Primary Examiner* — Michael R. Fin
(74) *Attorney, Agent, or Firm* — Kyle R. Satterthwaite; Ade & Company Inc.; Michael R. Williams

(57) ABSTRACT

A direct current circuit breaker comprises a mechanical relay in a first supply line configured to conduct electrical current during steady-state operation and an auxiliary relay assembly in parallel with the mechanical relay to define an auxiliary breaker path for conducting electrical current during transient operation of the circuit breaker. The auxiliary relay assembly comprises a power-semiconductor circuit configured for selective current conduction and for bidirectional current blocking when in a non-conductive state. There is also a controller configured to (i) activate the power-semiconductor circuit to conduct in response to a command signal to stop transfer of the electrical power, in order to provide a zero voltage condition under which the mechanical relay is to deactivate; (ii) deactivate the mechanical relay when current is being conducted through the auxiliary breaker path; and (iii) deactivate the power-semiconductor circuit after the mechanical relay is deactivated to stop the transfer of the power.

18 Claims, 7 Drawing Sheets

(58) Field of Classification Search
USPC .......................................................... 307/113
See application file for complete search history.

(56) References Cited

U.S. PATENT DOCUMENTS

| | | | | |
|---|---|---|---|---|
| 2012/0032727 | A1* | 2/2012 | Callanan | H01H 9/542 |
| | | | | 327/419 |
| 2013/0199912 | A1* | 8/2013 | Azzola | H01H 9/542 |
| | | | | 200/5 R |
| 2016/0314928 | A1* | 10/2016 | Niehoff | H01H 83/04 |
| 2019/0206638 | A1* | 7/2019 | Askan | H02H 3/08 |
| 2021/0367449 | A1* | 11/2021 | Soder | H02J 50/90 |

\* cited by examiner

DIRECT CURRENT CIRCUIT BREAKER AND RELATED METHOD

This application is a national phase filing of PCT/CA2021/050175 and claims priority from U.S. Provisional Application Ser. No. 62/977,840 filed Feb. 18, 2020.

FIELD OF THE INVENTION

The present invention relates to a direct current circuit breaker having both mechanical and electronic switches or relays, and a related method.

BACKGROUND

The development of Smart Grid brings a technological revolution from the traditional centralized ac power network. In terms of technological development, the applications of renewable energy and battery energy storage elements have become more mature, and more and more appliances are changed to dc power. Therefore, the development of dc microgrids (MG) becomes the trend in the future energy systems. It has already been applied in certain applications, such as marine smart ships, [1]-[2], and dc residential grid networks, [3]-[5], and more applications will be developed in the coming future. The system architectures and the system control algorithms are two main research areas to develop dc MG technology. Apart from that, the system protection is another key concern in dc MG, as it is related to the safety and stability of the whole system. Thus, in order to offer safe operations in the dc MG, a high-reliability dc protection circuit is required.

In the past few years, under the incense in the popularity of dc MG, a variety of hybrid protection solutions, [6]-[20], have recently been proposed to offer high-quality protection features and to overcome the reliability issues in the traditional mechanical breakers. In [6], a typical hybrid circuit breaker solution is demonstrated, as shown in FIG. 1A, where a fast mechanical switch is paralleling with a pair of high voltage semiconductor devices. The semiconductor pair is used to handle the transient process during the turn-on and turn-off moments, but it cannot enhance the reliability of the circuit breaker, and the galvanic isolation function of the relay is disabled. In [7] and [11], two different types of zero current switching (ZCS) hybrid circuit breaker solutions are presented, as shown in FIGS. 1B and 1C, respectively. In [7], an LC resonant circuit is applied to achieve ZCS. In [11], a pre-charged capacitor is used to guide the current through the system during the turn-off action and to guarantee ZCS behavior. Thus, a highly efficient design is produced. However, similar to [6], these ZCS solutions cannot provide the galvanic isolation function. In [12], another type of hybrid circuit breaker is proposed as shown in FIG. 1D. In the circuit structure, an auxiliary semiconductor pair is applied to connect in series with the mechanical switch and a snubber capacitor is applied to connect in parallel with the main circuit, which results in an enhancement in the circuit turn-off capability and an improvement in the system reliability. However, the system conduction loss will be larger since two power semiconductor are turned-on at the same time, and no galvanic isolation function is provided. In [18], an isolated hybrid circuit breaker is presented as shown in FIG. 1E. One more relay is involved in the hybrid circuit breaker solution, so the overall system can function with physical isolation. However, the design is in a single direction and the extra in mechanical switch causes a longer turn-off time and higher conduction losses.

SUMMARY OF THE INVENTION

According to an aspect of the invention there is provided a low voltage direct current (DC) circuit breaker for microgrid applications comprising:
a first supply line between a first input terminal and a first output terminal;
a second supply line between a second input terminal and a second output terminal;
the first and second input terminals defining an input port and the first and second output terminals defining an output port such that the first and second supply lines act to transfer electrical power between the input port and the output port;
a first mechanical relay in the first supply line configured to conduct electrical current between the first input and output terminals during steady-state operation of the DC circuit breaker;
a breakless conductive connection from the first mechanical relay to the first output terminal with no intervening switch therebetween;
an auxiliary relay assembly in parallel with the first mechanical relay to define an auxiliary breaker path for conducting electrical current during transient operation of the DC circuit breaker, the auxiliary relay assembly comprising a power-semiconductor circuit that comprises a pair of MOSFET power-semiconductor switches arranged in a bidirectional blocking configuration configured to selectively conduct electrical current along the auxiliary breaker path and for bidirectional current blocking when in a non-conductive state;
a second mechanical relay in the second supply line configured to conduct electrical current between the second input and output terminals; and
a controller operatively associated with each of the first mechanical relay and the auxiliary relay assembly, the controller being configured to:
activate the power-semiconductor circuit to conduct electrical current through the auxiliary breaker path, in response to a command signal to stop transfer of the electrical power between the input port and the output port, in order to provide a zero voltage condition under which the first mechanical relay is to deactivate;
deactivate the first mechanical relay when electrical current is being conducted through the auxiliary breaker path; and
deactivate the power-semiconductor circuit after the first mechanical relay is deactivated so as to stop the transfer of the electrical power between the input port and the output port.

Preferably, the auxiliary relay assembly further includes an auxiliary mechanical relay in the auxiliary breaker path, the auxiliary mechanical relay being arranged in series with the power-semiconductor circuit.

Preferably, the controller is configured to activate the auxiliary mechanical relay to conduct electrical current before activating the power-semiconductor circuit in response to the command signal to stop transfer of the electrical power between the input port and the output port.

Preferably, in such arrangements, the controller is configured to deactivate the auxiliary mechanical relay after the power-semiconductor circuit is deactivated such that the auxiliary mechanical relay is deactivatable under a zero current condition.

Preferably, in such an arrangement, the controller is configured to deactivate the relay in the second supply line after deactivating the power-semiconductor circuit such that the relay in the second supply line is deactivatable under a zero current condition.

Preferably, the mechanical relays are alternating current (AC) mechanical relays.

In one arrangement, the power-semiconductor circuit comprises at least one power-semiconductor switch having a maximum voltage rating greater than or equal to a peak voltage formed across the power-semiconductor circuit during deactivation of the power-semiconductor circuit following deactivation of the first mechanical relay by the controller.

Preferably, the DC circuit breaker further includes:

a supply-line current sensor along the first supply line arranged in series with a parallel configuration of the first mechanical relay and the auxiliary relay assembly for measuring electrical current through the first supply line;

an auxiliary-path current sensor along the auxiliary breaker path for measuring electrical current through the auxiliary breaker path;

wherein the controller is operatively communicated with the supply-line and auxiliary-path current sensors such that the controller is configured to deactivate the power-semiconductor circuit when the measured current in the auxiliary breaker path is substantially equal to the measured current in the first supply line.

Preferably, the DC circuit breaker further includes:

a supply-line current sensor along the first supply line arranged in series with a parallel configuration of the first mechanical relay and the auxiliary relay assembly for measuring electrical current through the first supply line;

an auxiliary-path current sensor along the auxiliary breaker path for measuring electrical current through the auxiliary breaker path;

wherein the controller is operatively communicated with the supply-line and auxiliary-path current sensors such that the controller is configured to deactivate the auxiliary mechanical relay when the measured current in the auxiliary breaker path is substantially equal to zero.

Preferably, the DC circuit breaker further includes:

a supply-line current sensor along the first supply line arranged in series with a parallel configuration of the first mechanical relay and the auxiliary relay assembly for measuring electrical current through the first supply line;

an auxiliary-path current sensor along the auxiliary breaker path for measuring electrical current through the auxiliary breaker path;

wherein the controller is operatively communicated with the supply-line and auxiliary-path current sensors such that the controller is configured to deactivate the relay in the second supply line when the measured current in the first supply line is substantially equal to zero.

According to another aspect of the invention there is provided a method of operating a direct current (DC) circuit breaker in series between a source and a load, comprising:

after receiving a command signal to stop transfer of electrical power between the source and the load, deactivating a first mechanical relay in a first one of two supply lines in the DC circuit breaker so as to transfer electrical current to an alternate electrical path along the first supply line along which there is located a power-semiconductor circuit in an active state for conducting electrical current;

after the first mechanical relay is deactivated, deactivating the power-semiconductor circuit in the alternate path so as to stop transfer of electrical power.

Preferably, after receiving said command signal but before deactivating the first mechanical relay, the power-semiconductor circuit in the alternate path is activated from a previous inactive state in which the power-semiconductor circuit is not conductive.

Preferably, the method further includes, after the power-semiconductor circuit is deactivated, deactivating an auxiliary mechanical relay in series with the power-semiconductor circuit along the alternate path so as to mechanically electrically isolate the source from the load along the first supply line.

Preferably, the auxiliary mechanical relay is deactivated when the electrical current in the alternate path is substantially equal to zero.

Preferably, the method further includes, after the power-semiconductor circuit is deactivated, deactivating a mechanical relay in a second one of the two supply lines so as to mechanically electrically isolate the source from the load along the second supply line.

Preferably, the mechanical relay in the second supply line is deactivated when the electrical current in the first supply line is substantially equal to zero.

Preferably, the power-semiconductor circuit is deactivated when the electrical current in the alternate path is substantially equal to the total electrical current through the first supply line.

Preferably, the method further includes:

prior to transfer of electrical power commencing between the source and the load, activating the power-semiconductor circuit while the first mechanical relay is in an inactive state to begin transfer of the electrical power between the source and the load; and when electrical current conducted through the DC circuit breaker has reached steady state:

activating the first mechanical relay to conduct current in parallel with the power-semiconductor circuit; and deactivating the power-semiconductor circuit so that the steady-state electrical current continues to be conducted along the first supply line by the first mechanical relay only.

BRIEF DESCRIPTION OF THE DRAWINGS

The invention will now be described in conjunction with the accompanying drawings in which.

In the drawings like characters of reference indicate corresponding parts in the different figures.

DETAILED DESCRIPTION

Figure 1A:
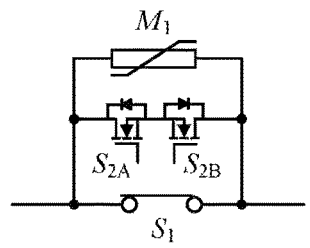
FIGS. 1A through 1E are schematic diagrams of prior art DC circuit breakers.
Figure 1B:
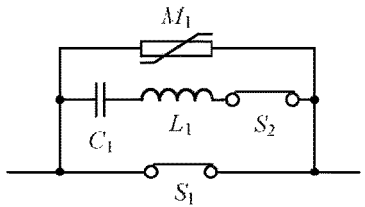
Figure 1C:
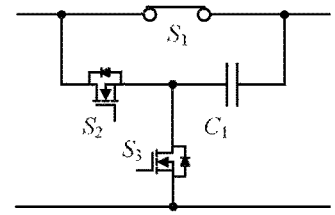
Figure 1D:
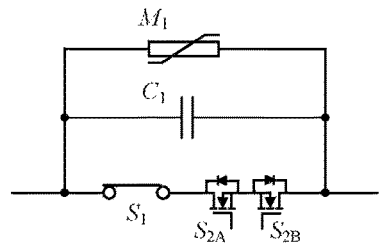
Figure 1E:
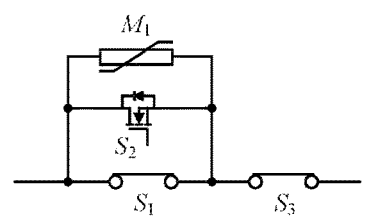
Figure 2:
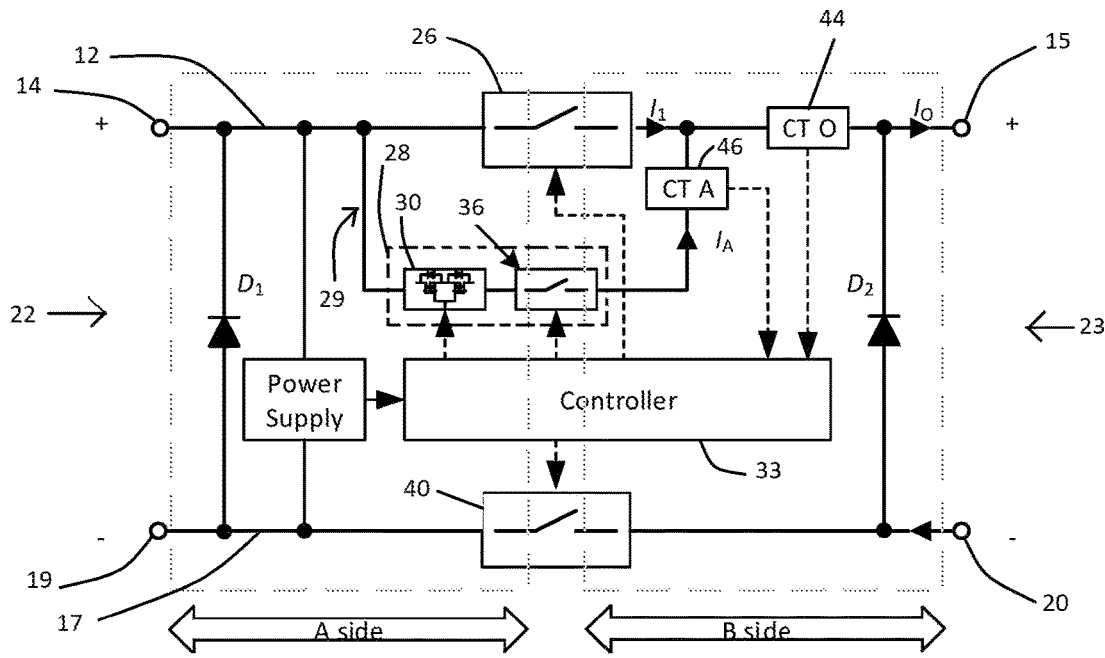
FIG. 2 is a schematic diagram of a DC circuit breaker according to an arrangement of the present invention.
Figure 3:
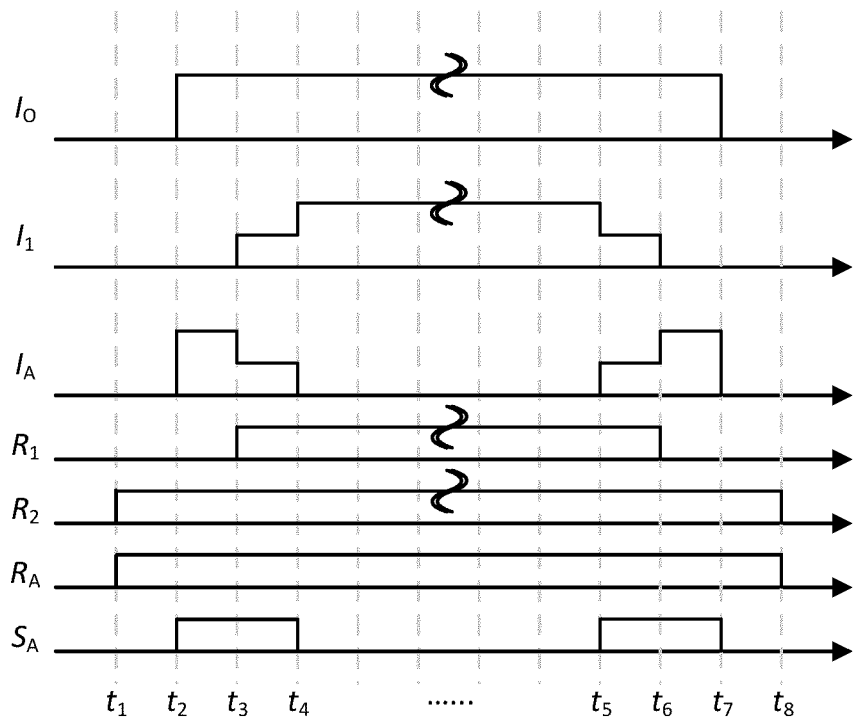
FIG. 3 is an operation sequence timing diagram of the arrangement of FIG. 2.
Figure 4:
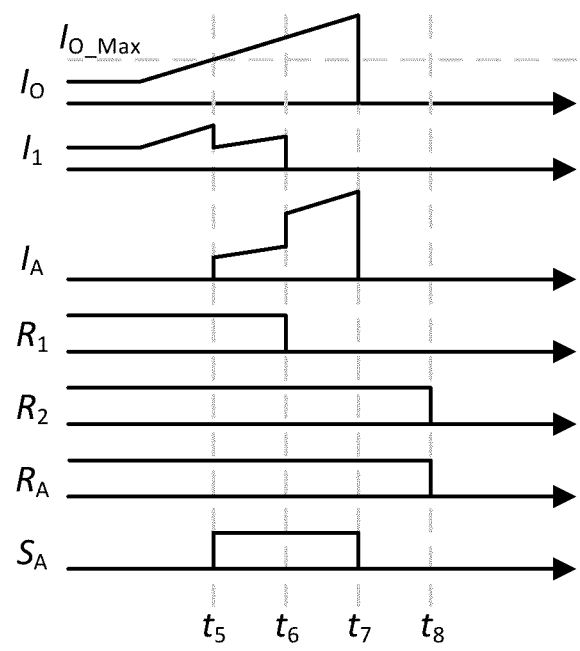
FIG. 4 is an operation sequence timing diagram of the arrangement of FIG. 2 during fault detection.
Figure 5:
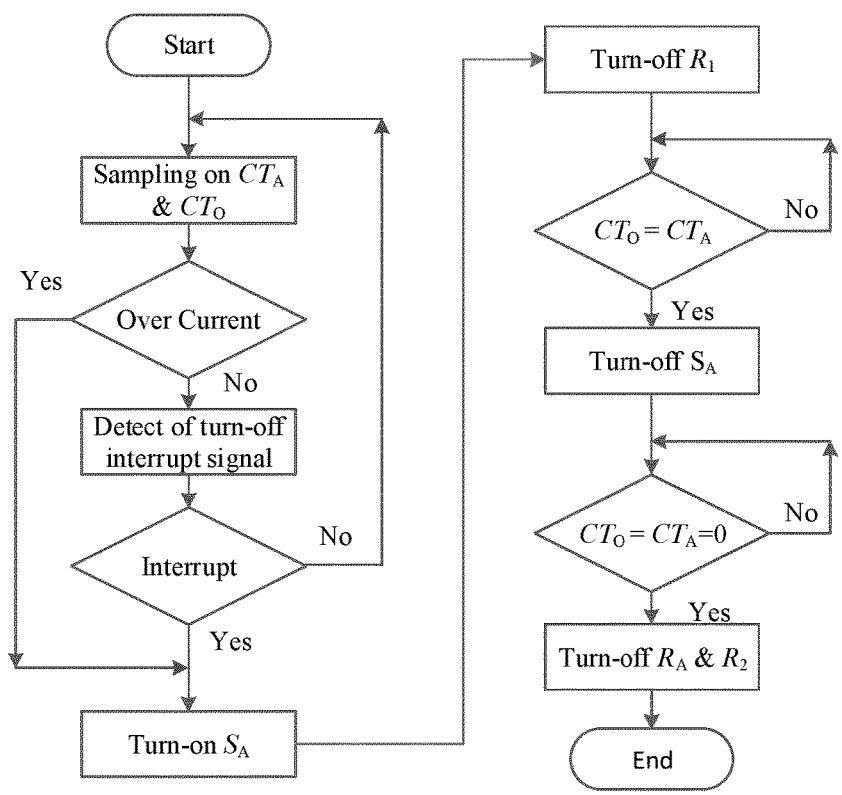
FIG. 5 is a flow chart of a turn-off sequence of the arrangement of FIG. 2.

The accompanying figures relate to a hybrid circuit breaker which may fulfill both high-reliability and high-efficiency features, and which is more clearly shown in FIG. 2.

Generally speaking, and with reference to FIG. 2, the circuit breaker of the present invention, which is suited for a direct current (DC) electrical power system, is indicated at 10 and comprises:

a first supply line 12 between a first input terminal 14 and a first output terminal 15;

a second supply line 17 between a second input terminal 19 and a second output terminal 20;

the first and second input terminals 19, 20 defining an input port 22 and the first and second output terminals defining an output port 23 such that the first and second supply lines 12, 17 act to transfer electrical power between the input port 22 and the output port 23;

a first mechanical relay in the first supply line 12, which is indicated at 26 and may be referred to hereinafter as 'Relay 1', that is configured to conduct electrical current between the first input and output terminals 14, 15 during steady-state operation of the DC circuit breaker;

an auxiliary relay assembly 28 in parallel with the first mechanical relay 26 to define an auxiliary breaker path 29 for conducting electrical current during transient operation of the DC circuit breaker, the auxiliary relay assembly 28 comprising a power-semiconductor circuit, which his indicated at 30 and may be referred to hereinafter as $S_A$, that is configured to selectively conduct electrical current along the auxiliary breaker path 29 and for bidirectional current blocking when in a non-conductive state;

a controller 33 operatively associated with each of the first mechanical relay 26 and the auxiliary relay assembly 28, the controller 33 being configured to:

activate the power-semiconductor circuit 30 to conduct electrical current through the auxiliary breaker path 29, in response to a command signal to stop transfer of the electrical power between the input port 22 and the output port 23, in order to provide a zero voltage condition under which the first mechanical relay 26 is to deactivate;

deactivate the first mechanical relay 26 when electrical current is being conducted through the auxiliary breaker path 29; and deactivate the power-semiconductor circuit 30 after the first mechanical relay 26 is deactivated so as to stop the transfer of the electrical power between the input port 22 and the output port 23.

In the illustrated arrangement, the auxiliary relay assembly 28 further includes an auxiliary mechanical relay, which is indicated at 36 and may be referred to hereinafter as 'Relay A', in the auxiliary breaker path 29 that is arranged in series with the power-semiconductor circuit 30. As such, the controller 33 is configured to activate the auxiliary mechanical relay 36 to conduct electrical current before activating the power-semiconductor circuit 30 in response to the command signal to stop transfer of the electrical power between the input port 22 and the output port 23. More specifically, the controller 33 is configured to deactivate the auxiliary mechanical relay after the power-semiconductor circuit is deactivated such that the auxiliary mechanical relay is deactivatable under a zero current condition.

There is also provided a relay in the second supply line 17, which is indicated at 40 and may be referred to hereinafter as 'Relay 2', that is configured to conduct electrical current between the second input and output terminals 19, 20. Furthermore, the controller 33 is configured to deactivate the relay 40 in the second supply line 17 after deactivating the power-semiconductor circuit 30 such that the relay 40 in the second supply line is deactivatable under a zero current condition. In the illustrated arrangement, the relay 40 in the second supply line is a mechanical relay.

In the illustrated arrangement, the first, auxiliary and second mechanical relays 26, 36 and 40 are alternating current (AC) mechanical relays, even though the circuit breaker 10 is to be used in a dc system.

The power-semiconductor circuit 30 of the auxiliary relay assembly 28 comprises at least one power-semiconductor switch having a maximum voltage rating greater than or equal to a peak voltage formed across the power-semiconductor circuit during deactivation thereof following deactivation of the first mechanical relay 26 by the controller. Alternatively, the power-semiconductor circuit 30 comprises at least one power-semiconductor switch without built-in overvoltage protection and there is provided a metal oxide varistor connected in parallel therewith. Regardless of which type of power-semiconductor switch is used, the power-semiconductor circuit preferably comprises a pair of power-semiconductor switches arranged in a bidirectional blocking configuration, for example a pair of unidirectional current-conducting power-electronic switches arranged in an antiparallel configuration.

In addition to the foregoing, the DC circuit breaker 10 further includes a supply-line current sensor along the first supply line 12, which is indicated at 44 and may be referred to hereinafter as 'CT O', that is arranged in series with a parallel configuration of the first mechanical relay 26 and the auxiliary relay assembly 28 for measuring electrical current through the first supply line 12, which is basically $I_O$ assuming that there is no or negligible current through protection device diode $D_2$ at the output port 23. Also, the circuit breaker 10 includes an auxiliary-path current sensor along the auxiliary breaker path 29, which is indicated at 46 and may be referred to hereinafter as 'CT A', for measuring electrical current through the auxiliary breaker path 29, which is indicated as $I_A$ in FIG. 2.

The controller 33 is operatively communicated with the supply-line and auxiliary-path current sensors 44, 46 such that the controller 33 is configured to:

deactivate the power-semiconductor circuit 30 of the auxiliary relay assembly when the measured current in the auxiliary breaker path $I_A$ is substantially equal to the measured current in the first supply line $I_O$;

deactivate the auxiliary mechanical relay 36 when the measured current in the auxiliary breaker path $I_A$ is substantially equal to zero; and deactivate the relay in the second supply line when the measured current in the first supply line $I_O$ is substantially equal to zero.

With reference now to FIGS. 2-5, there is also disclosed herein a method of operating a direct current (DC) circuit breaker in series between a source and a load, for example connected at the ports 22, 23, that generally comprises:

after receiving a command signal to stop transfer of electrical power between the source and the load, deactivating a first mechanical relay 26 in a first one of two supply lines 12 in the DC circuit breaker so as to transfer electrical current to an alternate electrical path along the first supply line, that is 29, along which there is located a power-semiconductor circuit 30 in an active state for conducting electrical current;

after the first mechanical relay 26 is deactivated, deactivating the power-semiconductor circuit 30 in the alternate path 29 so as to stop transfer of electrical power.

In this method, after receiving the command signal but before deactivating the first mechanical relay 26, the power-semiconductor circuit 30 in the alternate path 29 is activated from a previous inactive state in which the power-semiconductor circuit 30 is not conductive.

Additionally, after the power-semiconductor circuit 30 is deactivated, there is provided a step of deactivating an auxiliary mechanical relay 36 in series with the power-semiconductor circuit 30 along the alternate path 29 so as to mechanically electrically isolate the source from the load along the first supply line 12, which is preferably performed when the electrical current in the alternate path $I_A$ is substantially equal to zero.

After the power-semiconductor circuit 30 is deactivated, the method further includes a step of deactivating a mechanical relay 40 in a second one of the two supply lines 17 so as to mechanically electrically isolate the source from the load along the second supply line, which is preferably performed when the electrical current in the first supply line 12 is substantially equal to zero. The current in the first supply line is basically as indicated at $I_O$ assuming there is no or negligible current through protection device diode $D_2$ at the output port 23.

Furthermore, and more specifically, the power-semiconductor circuit 30 is deactivated when the electrical current in the alternate path $I_A$ is substantially equal to the total electrical current through the first supply line $I_O$.

Moreover, prior to transfer of electrical power commencing between the source and the load, that is between ports 22, 23, there is provided a step of activating the power-semiconductor circuit 30 while the first mechanical relay 26 is in an inactive state to begin transfer of the electrical power between the source and the load, and when electrical current conducted through the DC circuit breaker 10 has reached steady state, performing steps of (i) activating the first mechanical relay 26 to conduct current in parallel with the power-semiconductor circuit; and (ii) deactivating the power-semiconductor circuit 30 so that the steady-state electrical current continues to be conducted along the first supply line 12 by the first mechanical relay 26 only.

The proposed circuit breaker 10 is designed for low voltage to medium voltage dc microgrid (MG) applications, which supports bidirectional current and double line physical isolation feature on the entire system. In the design, each power line is handled by a mechanical relay to produce a low resistance connection path and the physical isolation feature in the turn-on and turn-off periods, respectively. Also, an auxiliary path is provided to handle the transient process in the dc breaker, which is formed by a mechanical relay and a pair of semiconductors. Based on the designed operational sequence, those power relays are able to operate under either under zero voltage switching (ZVS) or zero current switching (ZCS) during the transient action. As a result, the electrical stress in the mechanical relay is minimized, which results in an increase in the durability of the mechanical relay and provides the possibility of using an ac relay in a dc circuit. At the same time, the requirement on the mechanical relay can be reduced, so that it can be either dc or ac relays. The operation principles of the presented solution are given in this disclosure and describe the operational sequence in detail. A design guideline and selection of combinations are also provided. A 250 V 15 A experimental prototype has been implemented to verify the operation of the proposed circuit, that the system is able to provide a fast response in switching action and to protect the entire system under any system faults. The experimental results and detailed findings were consistent with the theoretical analysis.

Circuit Structure

The proposed solution comprises two main power relays, Relay 1 and 2 (conveniently referred to as R1, R2), and an auxiliary breaker path which is formed by a pair of semiconductor devices, $S_A$, and an auxiliary relay, Relay A (conveniently referred to as RA), in series connection. The details of the configuration are shown in FIG. 2. Two protection devices, diodes $D_1$ and $D_2$, are added to the circuit to protect those switches during the high energy breaking operations. Each of them is parallel to one end of the dc circuit. Two sets of current sensors, CTA and CTO, are applied which are used to measure the power line current and the auxiliary line current, as $i_O$ and $i_A$ separately. So that, an accurate fault detection and the general switching action are guaranteed.

Among those three mechanical relays, two of them are used to provide isolation on the main power path and the third one provides isolation in the auxiliary path. As a result, when a fault appears, both sides of the breaker circuit system can be physically isolated and a safe system environment can be guaranteed in the targeting MG application. Relays 1 and 2 are the two main relays in the circuit, which are used to establish the connection path between both systems ends and are the conduction channel on the general scenario. The turn-on and turn-off transient of Relay 1 and 2 are also under ZVS, therefore, the electrical arc is eliminated. Relay A is the auxiliary relay in the circuit, which is used to establish the connection path for the semiconductor pair during the transient period and are the major conduction channel during the braking action. The turn-on and turn-off transient of Relay A is also under both ZVS and ZCS, thus, the stress of switching transient can be significantly reduced.

The pair of semiconductor device only functions actively during the turn-on and turn-off transient period and acts as a main breaker of the whole system. The semiconductors are used to compensate for the energy during braking and to offer the ZVS condition for the main mechanical breaker. As a result, the durability of the mechanical breaker system is enhanced. It can be realized by connecting two MOSFETs back-to-back in series or other bidirectional-blocking switch configurations. With this design, the proposed solution can achieve high reliability and high efficiency at the same time.

In order to achieve ZVS in the mechanical relays, a specific operation sequence is required. According to the operating situations, the dc breaker will operate in different scenarios. A detailed operational sequences at the normal and fault situations are given in FIGS. 3 and 4, respectively. Also, a program flow of the turn-off sequence is given in FIG. 5.

Operation Sequence at Turn-on Situation

Stage 1 [t=$t_1$]—After the start-up signal is given, the circuit begins to operate. Turn-on signals are given to R2 and RA. During this time, R2 becomes conduction and provides a return path for current. At the same time, the physical isolation of the auxiliary path is removed. RA becomes conduction and establishes a path to connect the semiconductor devices to both system terminals. At this period, the main connection channel is not yet established, so no current flows through the circuit. The breaker path in the auxiliary connection is settled and this stage accomplishes when R2 and RA are conducting.

Stage 2 [t=$t_2$]—A turn-on signal is given to $S_A$ to release the bidirectional blocking from the semiconductor devices. During this time, $S_A$ becomes ON and a connection path between both ends of the circuit is established as an auxiliary channel. The dc current starts to flow from one terminal to the other through the auxiliary path. This period of time ends after the semiconductor is fully ON.

Stage 3 [t=$t_3$]—A turn-on signal is given to R1. During this time, R1 becomes ON and is switched under zero voltage condition. The major connection path between both positive terminals is built up. Due to the lower resistance characteristic, the major dc current will bypass the auxiliary path and start to flow through R1 as I1. The overall output current, IO, remains the same at the last stage, however, the current in the auxiliary path, IA, starts to reduce. This period of time ends after R1 is fully ON in a certain time phase and a current reduction in IA is detected.

Stage 4 [t=$t_4$]—A turn-off signal is given to $S_A$ to disable the auxiliary connection path. During this time, $S_A$ becomes OFF and is switched under zero voltage condition. Afterwards, the auxiliary channel is electrically disconnected from the main circuit. The dc current will only flow through the two main relays, in which I1 becomes the same as IO. This period ends when I1 becomes zero. And the system turn-on transient sequence is finished and only two main relays are remaining ON.

Operation Sequence at Turn-Off Situation

Stage 5 [t=$t_5$]—After the disconnection signal is given from the general shutdown process or from fault detection, the circuit turn-off operation sequence begins. A turn-on signal is given to $S_A$ to build up the connection path between both ends of the circuit as an auxiliary channel. During this time, $S_A$ becomes ON and a part of dc current starts to flow through this alternative path as IA. However, due to the high resistance characteristic, the major dc current still remains to conduct through R1. Also, IO remains the same at the previous stage. This period of time ends after the semiconductor is fully ON and a current reduction in I1 is detected.

Stage 6 [t=$t_6$]—A turn-off signal is given to R1. During this time, R1 becomes OFF and is switched under zero voltage condition. The main conduction path in the positive terminal is disconnected, thus, I1 is forced to zero. The circuit still remains conducting, as, the auxiliary path is still connecting. The overall output current, IO, is kept similar to the last stage. This period of time ends after R1 is fully OFF and the current value of IA is exactly equal to I1.

Stage 7 [t=$t_7$]—A turn-off signal is given to $S_A$ to disable the auxiliary connection path. During this time, $S_A$ becomes OFF and it acts as the main breaker during this period. All energy among the breaking action will be dissipated through the semiconductor devices. Therefore, the selection of the semiconductor is very significant in the design. This period ends when I1 becomes zero and the bidirectional blocking feature is reformulated. No more current is flowing through the breaker circuit.

Stage 8 [t=$t_8$]—A turn-off signal is given to both RA and R2. During this time, both relays become OFF and are switched under zero current stress. Thus, during the turn-off transient action, no electrical stress is applied to the device. Afterwards, both of the auxiliary channel and the current return path are physically disconnected from the main circuit. As a result, through the dc circuit breaker, both sides of the systems are fully isolated from each other. This can guarantee to have a safe environment for workers during grid or device repairing. The circuit remains OFF until a reconnection signal is given.

Design of Protection Circuit

The proposed circuit is a hybrid dc breaker solution, which consists of both mechanical relays and semiconductor devices. In a traditional dc breaker solution, a single mechanical relay or a solid-state breaker is applied to act as both power line current conductors during the normal situation and circuit breaker during the transient situation.

Among the traditional breaker technologies, mechanical relay and solid-state relay are two of the commonly used devices. Some of the existing dc breakers on the markets are listed in Table I as reference. The key features are highlighted in the table. The mechanical relays are physical switches, which use the electromagnetic contact to control the circuit operation. They are with low conduction resistance and can provide high-level insulation on the device. However it is not able to handle the surge current and the durability is usually bad, around 10 k times. In contrast, the solid-state relays are most likely semiconductor-based. It provides fast response and low contacting arc. The drawback is the high conduction resistance and the absence of physical isolation. Hence, for solid-state relays, the overall system reliability is limited and the system efficiency is restricted.

Different from the single breaker solution, for the proposed solution, the major functions in the dc breaker circuit solution are separated clearly into two divisions, conduction and breaker. Each function is handled by a certain device, the advantage of both types of device can be fully utilized while their disadvantages are eliminated in the hybrid solution. In the design, mechanical switches are selected to handle the current conduction in the power line during the normal situation, and semiconductor-based switches are selected to handle the breaking action during the transient period.

Selection of Mechanical Relays

Figure 6A:
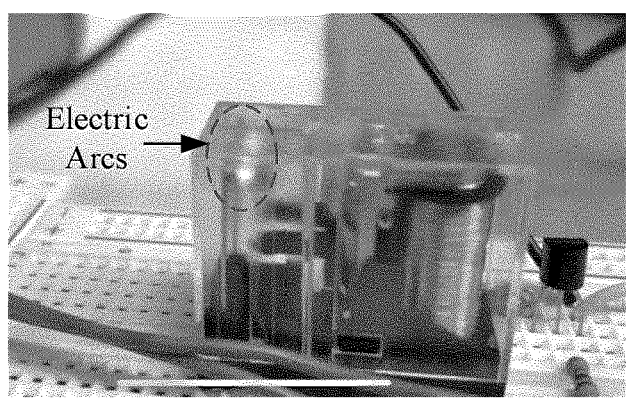
FIGS. 6A and 6B illustrate a mechanical relay of an experimental setup for testing the arrangement of FIG. 2, shown during electric arcs and after repetitive switching action, respectively.
Figure 6B:
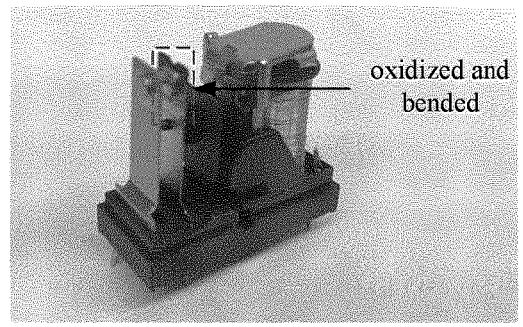

In the traditional approach, during each switching action, there is always an electrical arc between the two contracted planes. One of the examples is given in FIG. 6A, which is conducted under the on-site test. Under high voltage and high current on-off actions, the contracted plane will heat up and a small portion of the surface will be oxidized. For the oxidized area will result in high resistive and influence the next performance. After a long term repetitive breaking action, the surface will be completely oxidized and the contractor may be bent, as shown in FIG. 6B. Finally, the relay will no longer function properly and result in failure.

In the proposed solution, mechanical switches are applied to handle the current conduction in the power line during the normal situation and to provide a physical isolation feature. The voltage rating of the relay is used to support the breakdown voltage of the system and the current rating of the relay is used to handle the current capability during the conduction period. However, different from the traditional approach, in the proposed solution, all the mechanical relays are switched under ZVS. Benefiting from that, in the selection of the relays, the design can consider:

1) Ac relays in the proposed dc relay circuit. All the relays are switched under soft switching conditions, which means that no electrical stress is applied to the components during the transient actions. The voltage rating of the relays is only used to guarantee that the circuit with enough voltage insulation for the system. Therefore, ac relays can be adopted into the selection on the mechanical relays instead of the bulky and expensive dc relays. For example, a 250 Vac relay can apply to a dc circuit breaker design up to 353.6 Vdc. Therefore, it is especially suitable for low to medium voltages of dc MG.

2) Mechanical durability as the system durability instead of electrical durability. All the relays are switched under zero electrical stress, which means that no more electrical arc appears in the transient mechanical action. The main power relay R1 is always paralleled with an auxiliary branch during the switching transient. Thus, a smooth transient action is guaranteed in R1. The other two relays, RA and R2, are even better which are switched under zero current situation. Overall, only mechanical operation during the switching time frame, but without any electrical stress. The reliability of the mechanical relays is enhanced, where the limitation in the electrical durability is becoming close to the mechanical ac relays at the datasheet value.

In the target 250 Vdc 15 A dc breaker system, an ac relay, G2R-1A-E, is selected. It features with a 16 A current capability at 250 Vac voltage, 100 k times in mechanical durability, and 2 mΩ low resistance characteristics.

Selection of Semiconductors

In the design, semiconductor switches are applied to handle the transient switching action in the breaker circuit. Also, in order to offer a bidirectional blocking function, the semiconductor switches are required to be in a pair. For discrete devices, they can be arranged into a back-to-back, drain-to-drain or other bidirectional configuration. The voltage rating of both semiconductors should consider the breakdown voltage of the system and the current rating of the semiconductors is used to handle the current capability during the transient situation.

Figure 7:
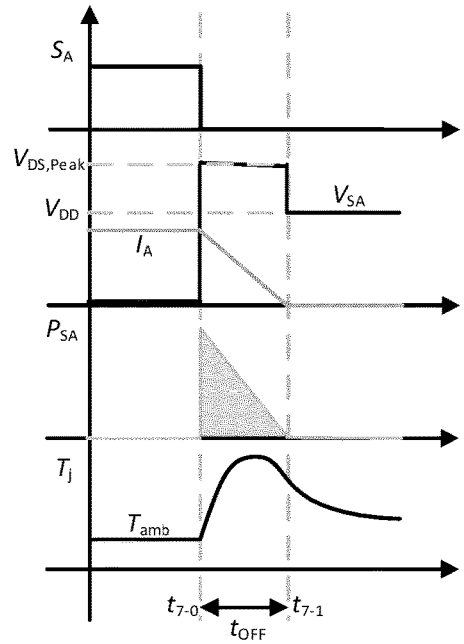
FIG. 7 shows overvoltage performance of a MOSFET at stage 7 in the turn-off sequence, when used in a power-semiconductor circuit in the arrangement of FIG. 2.

Among the switching sequences, the most critical breaking action appears in stage 7. At stage 4 and stage 5, $S_A$ is switched ON and OFF under zero voltage conditions, respectively. However, at stage 7, due to the presence of parasitic inductance in the loop, high voltage stress will occur between the drain and source of the semiconductor under the turn-off transient. The detailed switching action of $S_A$ during stage 7 is given in FIG. 7.

For IGBTs or other semiconductors without overvoltage capability, the worst-case scenario will be the device breakdown voltage is reached and the device fault has happened. Thus, a metal oxide varistor (MOV) is required to connect in parallel with the semiconductor pair to protect the excessive transient voltage. For power MOSFET, the worst-case scenario is that it will enter the avalanche mode. Generally, inside a traditional MOSFET, there is a group of parasitic components inside the physical structure, such as parasitic resistance in P-well channel structure and a parasitic NPN bipolar transistor structure [21]. Normally, the parasitic NPN is effectively shorted. However, during the turn-off moment, a strong electric field is resultant inside the device which causes current flow proximity to the parasitic NPN transistor internally. Once the current flow causes sufficient voltage across on it, the parasitic bipolar transistor will become activated and will claim the device voltage at a value that is 1.2 to 1.3 times higher than the general breakdown voltage.

By applying the Kirchhoff's voltage law to the main current loop, the detail characteristic of the overvoltage or the avalanche period can be determined. The circuit relationship at stage 7 is formed as, $$V_{DD} = V_{DS,Peak} + L_{loop} \cdot \frac{dI(t)}{dt} + R_{loop} \cdot I(t) \quad (1)$$

where $V_{DD}$ is dc voltage at the input side, $V_{DS,\ Peak}$ is overvoltage or the avalanche voltage applied to the semiconductor in stage 7, I is dc current flowing in the circuit, $L_{loop}$ is loop inductance or parasitic inductance in the current path and $R_{loop}$ is parasitic resistance at the current path.

By solving (1) with the start point and the endpoint circuit information, the corresponding turn-off time, $t_{OFF}$, is determined as, $$t_{OFF} = \frac{L_{loop}}{R_{loop}} \ln\left[1 + \frac{I_{peak} \cdot R_{loop}}{V_{DS,Peak} - V_{DD}}\right] \quad (2)$$

During the turn-off period, the power dissipation in the MOSFET is approximating to a triangle waveform. According, the corresponding energy dissipation, EOFF, is simplified to, $$E_{OFF} \cong \frac{1}{2} \cdot V_{DS,Peak} \cdot I_{peak} \cdot \frac{L_{loop}}{R_{loop}} \ln\left[1 + \frac{I_{peak} \cdot R_{loop}}{V_{DS,Peak} - V_{DD}}\right] \quad (3)$$

With the use of (3), the maximum rating in the target system and a 2 µH parasitic loop inductance assumption, a 0.2 mJ worst-case energy dissipation can be calculated.

According to the maximum rating of the target system, 150 Vdc and 15 A, and the worst-case energy dissipation, 0.2 mJ, in the target dc breaker system, a discrete TO247 power MOSFET, IPW60R125C6, is selection. It features with a 0.96 mJ for repetitive energy, around 70 A pulse current at 80° C., and with a 600 Vdc breakdown. A summary of the selected components is given in Table I.

Experimental Verifications

Figure 8A:
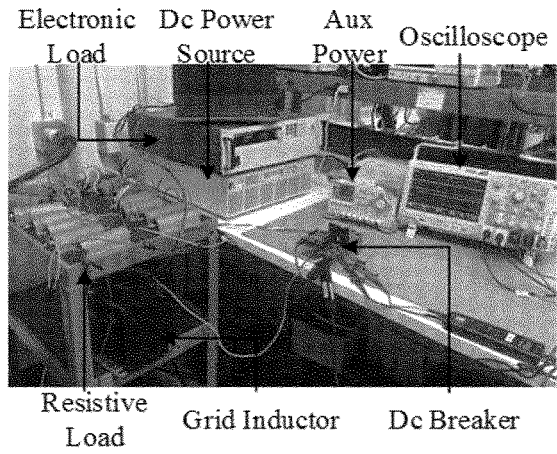
FIGS. 8A and 8B illustrate a test setup for testing the arrangement of FIG. 2 and a prototype of the arrangement of FIG. 2, respectively.
Figure 8B:
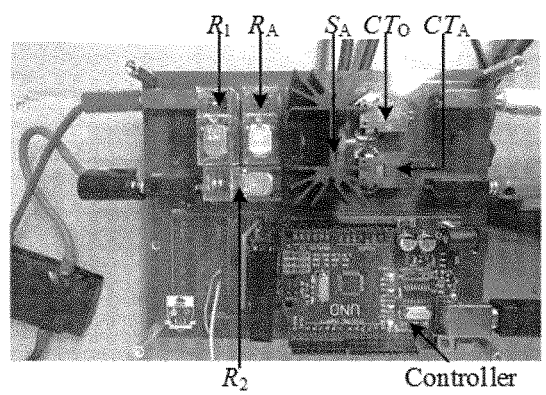

A 150 Vdc 15 A test platform with a dc breaker prototype, as shown in FIGS. 8A and 8B, is built to verify the performance of the proposed dc circuit breaker and the target operating conditions defined in Table I. The prototype shows that the entire system is controlled by a single microcontroller and the protection feature comes from the accurate current detection by the Hall-effect sensors. Compared to the two relays traditional system, in the proposed solution, an extra relay and a pair of semiconductor switches were applied, in which the semiconductor pair were arranged in back-to-back connection. According to the given control strategy, the power consumption of the auxiliary circuit was kept within 3 W. At the standby mode, only 0.95 W was consumed. At the normal operation mode, 2.85 W was consumed, which is closed to the traditional approach.

Figure 9A:
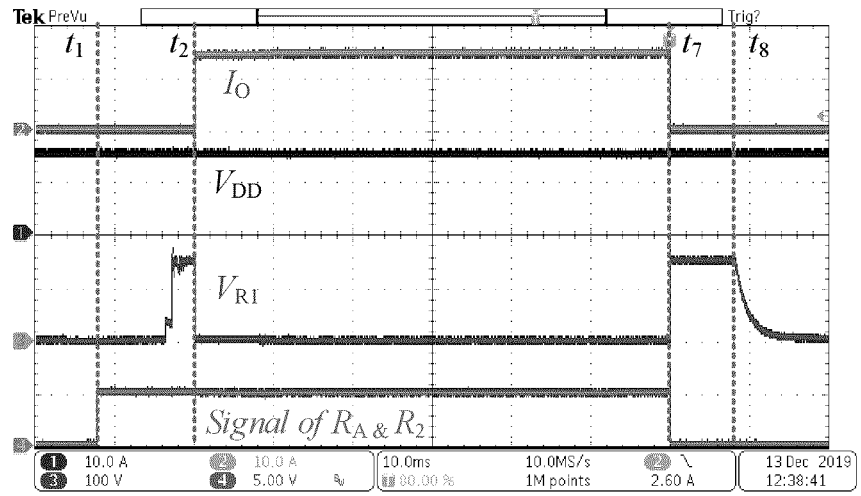
FIGS. 9A and 9B show experimental results under purely resistive loading related to a circuit isolation feature and a main current path, respectively.
Figure 9B:
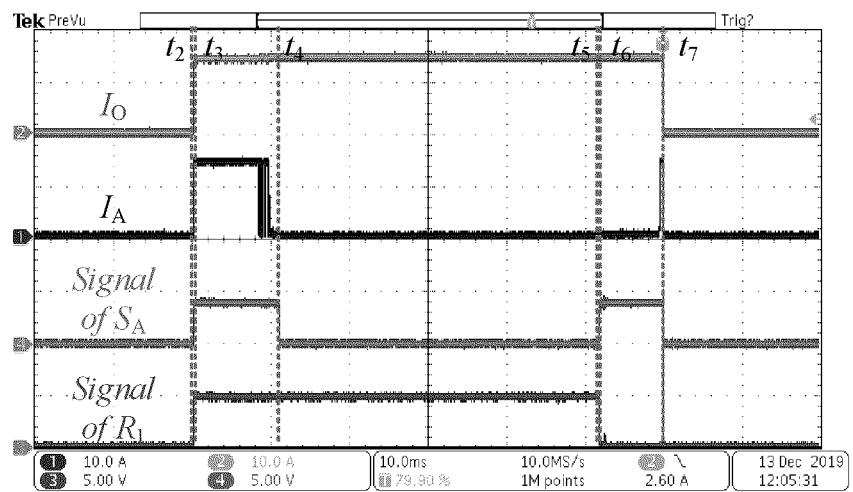

In FIGS. 9A and 9B, it demonstrates the complete operating sequence and stable system performance of the circuit during on and off conditions, where the sequence is the same as the one proposed earlier. Test was conducted under a purely resistive loading, where one side of the circuit breaker was connected to a 150 Vdc programmable power source and another side was connected to a 10Ω resistive load.

All the time, the mechanical relay required a certain amount of time to respond, where the response time was approximately 7 to 9 ms. For example, in FIG. 9A, after the turn-on signal was provided to R1 at $t_1$, the first mechanical action appeared in 8 ms afterward. In each operation, there involved two mechanical actions. During the turn-on transient, half of the time was used to set up the conducting path at R2 and RA. And another half of the time was used to handle the current conduction action, especially for the setup on R1. As shown in FIGS. 8A and 8B, after the first mechanical action is ready, it still requires a settling time to stabilize the relay. Similarly, during the turn-off transient, half of the time was used to handle the current breaking action on R1 and $S_A$ and another half was used to set up the isolation feature at R2 and RA. Finally, the required start-up time was around 25 ms and the breaking time was around 16 ms, which was still within the 30 ms range.

In FIG. 9A, it shows the switching pattern that relates to the circuit isolation feature. R1 and RA were synchronized in action. Their switching actions were both under the zero current scenario, either before the current started flowing through the main circuit or the current path was disconnected. They were used to rebuild the part of the system connection paths at $t_1$ or to feature with the galvanic isolation at $t_8$. In FIG. 9B, it shows the switching pattern that relates to the main current conduction. $S_A$ was only active during the switching transient at the dc breaker circuit. It provided an auxiliary path for the current conduction during the transient period and generated a ZVS condition for the main power line relay. R1 was switched under the auxiliary path was conducted. A smoothly current transient waveform was observed and no electrical arc was observed from the experimental setup.

Figure 10A:
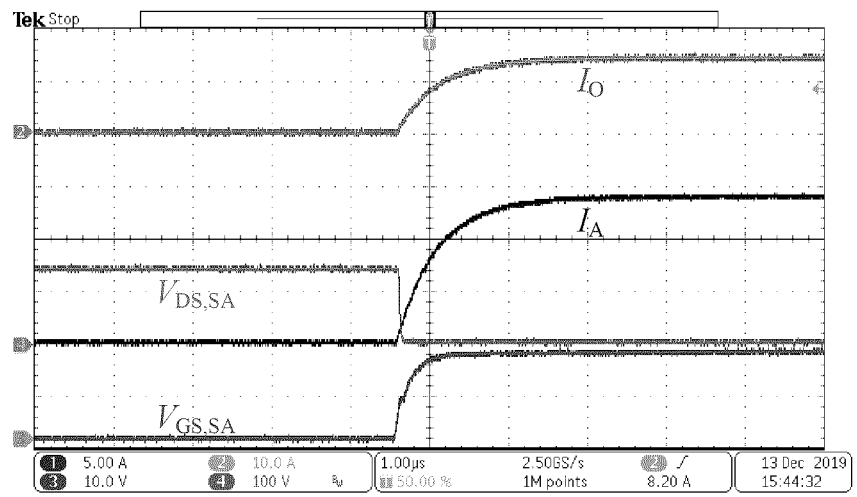
FIGS. 10A and 10B show experimental results of $S_A$ under purely resistive loading, and more specifically during a turn-on transient at $t_2$ and a turn-off transient at $t_7$, respectively.
Figure 10B:
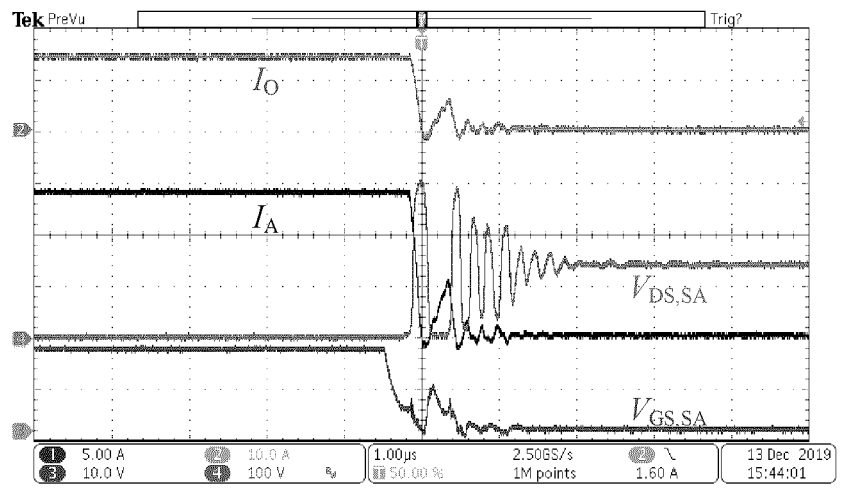

Under the purely resistive loading testing case, the turn-on and turn-off switching performances of the semiconductor pair are shown in FIGS. 10A and 10B, respectively. It clearly demonstrated in both situations, the switching time was also maintained within 1 μs. It proved that the major restriction in the operation time of the hybrid circuit was mainly limited by the mechanical operation. If a faster system response is required, only the mechanical ac relay is required to replace and the rest of the circuit does not affect. Also, from FIGS. 10A and 10B, it demonstrates that the semiconductor pair is able to handle the transient responses in the dc breaker circuit properly. Even, high voltage stress was applied to the device during turn-off transient, a safe response was still able to be guaranteed.

Figure 11:
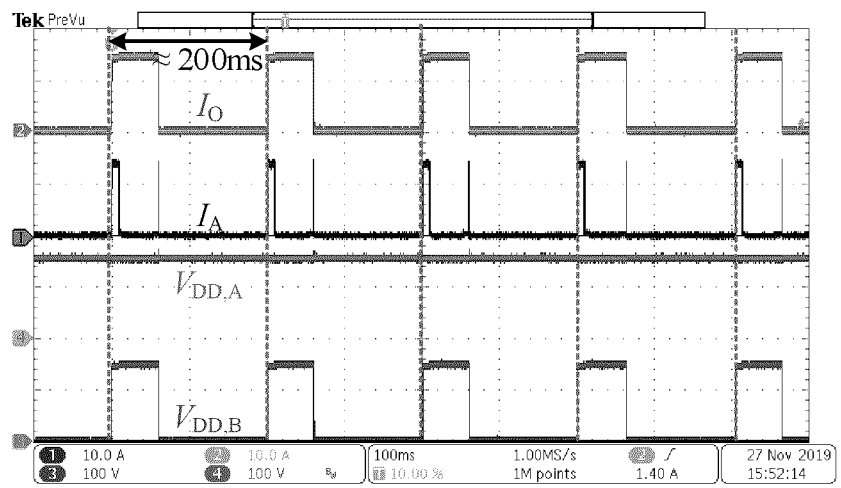
FIG. 11 shows a reliability testing sequence under pure resistive load.

In order to verify the reliability of the platform, repeated interrupts were performed on the designed system. The test sequence is given in FIG. 11 with 200 ms per cycle at 150 Vdc and 15 A. Two sets of circuit prototypes were tested. Both of them were capable of running cycles above 100 thousand times, which was much higher than the original electrical durability of a mechanical relay.

Figure 12A:
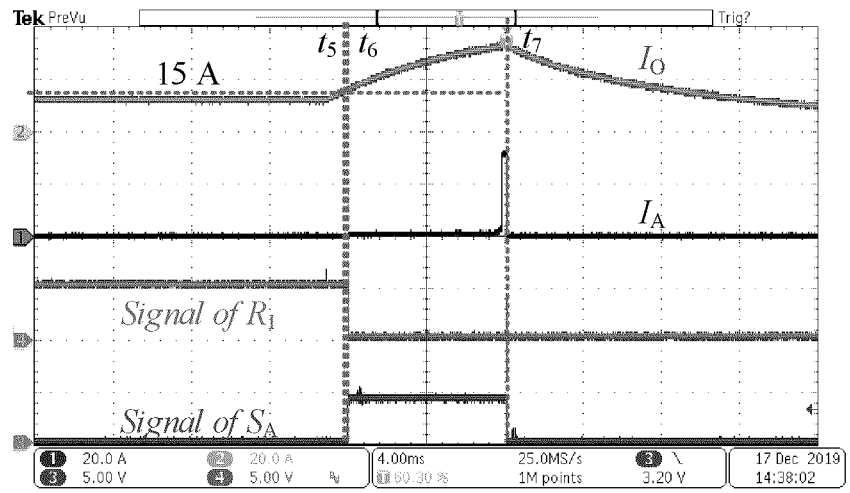
FIGS. 12A and 12B show experimental results of overcurrent projection under inductive loading, and more specifically a control signal and device stress in $S_A$, respectively, during same.
Figure 12B:
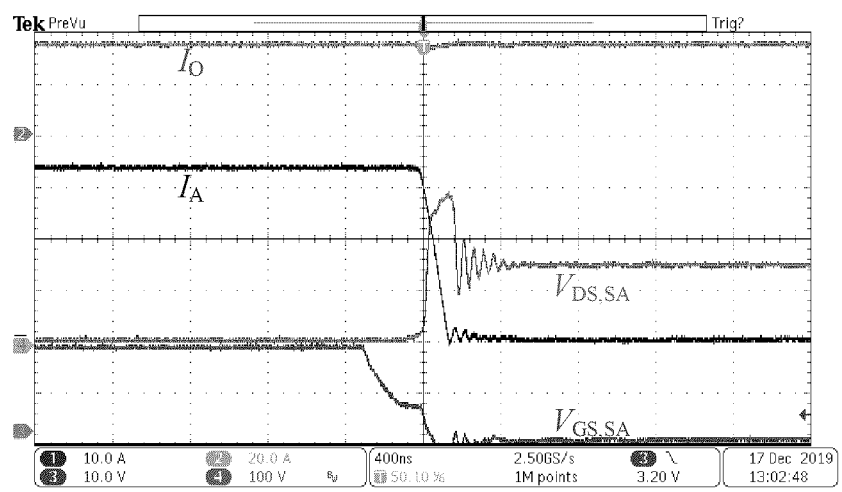

Apart from normal operation, the system was also stable during overcurrent operation. In FIGS. 12A and 12B show the system performance during over current situation at an inductive loading. The inductive loading was formed by a 20 mH grid inductor and a 12.5Ω electronic load. During the transient action, the load was dropped from 12.5Ω to 3.7Ω. As shown in FIG. 12A, when current is over the limited, 15 A, the system is able to disconnect both terminals from an over specification current, 38 A, in a certain time period. The action time was maintained around 16 ms, no electrical arcs were observed in all there relays, and a correct semiconductor breaking waveform was observed. Also, the protection diode was able to handle the inductive energy after the main current path was disconnected. Therefore, a stable system was able to be guaranteed.

CONCLUSION

There is disclosed herein an alternative solution to the dc breaker design. In the concept, it makes use of both mechanical switches and semiconductor switches. Each of them deals with a key feature in the dc breaker. The mechanical switches focus on the normal conduction and the semiconductor switches handle the breaker transient. Therefore, the breaker design guarantees with bidirectional current flow, galvanic isolation, high reliability, and high efficiency. The performance of the proposed concept was experimentally verified in a 250 V, 15 A dc breaker setup, where the operation of both resistive and inductive loads have been tested. The results showed that the proposed solution achieved a fast response in switching action and was featured with high-reliability performance. All the demonstration results are shown with good agreement is achieved between theoretical concepts and experimental results. The proposed Dc hybrid breaker is promosing for the applications of dc grid, PV array and battery protections.

As described hereinbefore, an aspect of the present invention relates to a new hybrid circuit breaker solution for use in dc microgrids which hoffers a high-reliability projection feature for the dc microgrid with bidirectional current flow, high-durability and galvanic isolation function. The circuit breaker comprises a group of mechanical switches and semiconductors, in which the mechanical switches handle the current conduction in the normal situation and the semiconductors handle the breaker response in transient action. The design fully utilizes the advantage of both types of switch and maximizes the performance and lifetime of the system. The high conductivity of the mechanical switch is maintained, but the electrical stress during transient applied to the mechanical switch is eliminated. Thus, an effective solution is provided for the design of dc circuit breakers. The operation principle is explained in details and the design guideline is provided. A 150 Vdc/15 A circuit breaker is successfully implemented and the performance is experimentally verified which shows good agreement with the theoretical findings.

The scope of the claims should not be limited by the preferred embodiments set forth in the examples but should be given the broadest interpretation consistent with the specification as a whole.

REFERENCES

[1] Accetta and M. Pucci, "Energy Management System in DC Micro-Grids of Smart Ships: Main Gen-Set Fuel Consumption Minimization and Fault Compensation," IEEE Trans. Ind. Appl., vol. 55, no. 3, pp. 3097-3113, May-June 2019.

[2] Z. Jin, L. Meng, J. M. Guerrero and R. Han, "Hierarchical Control Design for a Shipboard Power System With DC Distribution and Energy Storage Aboard Future More-Electric Ships," IEEE Trans. Ind. Informat., vol. 14, no. 2, pp. 703-714, February 2018.

[3] P. Sanjeev, N. P. Padhy and P. Agarwal, "Peak Energy Management Using Renewable Integrated DC Microgrid," IEEE Trans. Smart Grid, vol. 9, no. 5, pp. 4906-4917, September 2018.

[4] L. Roggia, L. Schuch, J. E. Baggio, C. Rech and J. R. Pinheiro, "Integrated Full-Bridge-Forward DC—DC Converter for a Residential Microgrid Application," IEEE Trans. Power Electron., vol. 28, no. 4, pp. 1728-1740, April 2013.

[5] A. Chub, D. Vinnikov, R. Kosenko, L. Liivik and I. Galkin, "Bidirectional DC-DC Converter for Modular Residential Battery Energy Storage Systems," IEEE Trans. Ind. Electron.

[6] C. Meyer, M. Kowal and R. W. De Doncker, "Circuit breaker concepts for future high-power DC-applications," in Proc. IEEE IAS2005, 2005., pp. 860-866 Vol. 2, October.

[7] R. Lazzari and L. Piegari, "Design and Implementation of LVDC Hybrid Circuit Breaker," IEEE Trans. Power Electron., vol. 34, no. 8, pp. 7369-7380, August 2019.

[8] C. Peng, X. Song, A. Q. Huang and I. Husain, "A Medium-Voltage Hybrid DC Circuit Breaker—Part II: Ultrafast Mechanical Switch," IEEE J. Emerg. Sel. Topics Power Electron., vol. 5, no. 1, pp. 289-296, March 2017.

[9] "Commutating type DC circuit breaker arrangement," EU Patent, EP0556616 (B1), 1993.

[10] "Hochspannungsgleichstromschalter," EU Patent, EP0108279 (B1), 1982.

[11] J. Meyer and A. Rufer, "A DC hybrid circuit breaker with ultra-fast contact opening and integrated gate-commutated thyristors (IGCTs)," IEEE Trans. Power Del., vol. 21, no. 2, pp. 646-651, April 2006.

[12] "Hybrid dc circuit breaking device," WO Patent, WO 2013/093066 (A1), 2015.

[13] "Hybrid dc circuit breaking device," US Patent, US2015/0022928 (A1), 2015.

[14] Q. Song et al., "A Modular Multilevel Converter Integrated With DC Circuit Breaker," IEEE Trans. Power Del., vol. 33, no. 5, pp. 2502-2512, October 2018.

[15] "High-voltage direct-current breaker," CN Patent, CN103618298 (B), 2017.

[16] X. Song, C. Peng and A. Q. Huang, "A Medium-Voltage Hybrid DC Circuit Breaker, Part I: Solid-State Main Breaker Based on 15 kV SiC Emitter Turn-OFF Thyristor," IEEE J. Emerg. Sel. Topics Power Electron., vol. 5, no. 1, pp. 278-288, March 2017.

[17] "HVDC hybrid circuit breaker with snubber circuit," US Patient, U.S. Pat. No. 8,891,209 (B2), 2011.

[18] X. Pei, O. Cwikowski, A. C. Smith and M. Barnes, "Design and Experimental Tests of a Superconducting Hybrid DC Circuit Breaker," IEEE Trans. Appl. Supercond., vol. 28, no. 3, pp. 1-5, April 2018.

[19] "Hybrid dc circuit breaking device," U.S. Pat. No. 5,452,170 (A), 1995.

[20] "Sequential switching circuit breaker for high power ac or dc power transmission circuits," U.S. Pat. No. 3,534,226A, 1968.

[21] T. McDonald, M. Soldano, A. Murray, and T. Avram, "Power MOSFET Avalanche Design Guidelines" Application Note AN-1005, International Rectifier.

TABLES

TABLE I

System parameter comparison.

| Model | Hongfa - HFS33/D-200D10M | Crydom - 84137850 | TE Connectivity - AP10B245 | Omron Electronics - G9EB-1 | Proposed |
|---|---|---|---|---|---|
| Type | SolidState | SolidState | Mechanical Vacuum Relay | Mechanical with gas-filled | Hybrid |
| DC Voltage/V | 200 | 200 | 270 | 250 | 150 |
| DC Current/A | 10 | 10 | 10 | 20 | 15 |
| Max Surge/A (10 ms) | 40 | 60 | N.A | N.A | 40 |
| Resistance/Ω | 105 m | 210 m | 10 m | 30 m | <5 m |
| Electrical Durability | >100 k | >100 k | 7 k | 30 k | >100 k |

The invention claimed is:

1. A low voltage direct current (DC) circuit breaker for microgrid applications comprising:
    a first supply line between a first input terminal and a first output terminal;
    a second supply line between a second input terminal and a second output terminal;
    the first and second input terminals defining an input port and the first and second output terminals defining an output port such that the first and second supply lines act to transfer electrical power between the input port and the output port;
    a first mechanical relay in the first supply line configured to conduct electrical current between the first input and output terminals during steady-state operation of the DC circuit breaker;
    a breakless conductive connection from the first mechanical relay to the first output terminal with no intervening switch therebetween;
    an auxiliary relay assembly in parallel with the first mechanical relay to define an auxiliary breaker path for conducting electrical current during transient operation of the DC circuit breaker, the auxiliary relay assembly comprising a power-semiconductor circuit that comprises a pair of MOSFET power-semiconductor switches arranged in a bidirectional blocking configuration configured to selectively conduct electrical current along the auxiliary breaker path and for bidirectional current blocking when in a non-conductive state;
    a second mechanical relay in the second supply line configured to conduct electrical current between the second input and output terminals; and
    a controller operatively associated with each of the first mechanical relay, the second mechanical relay and the auxiliary relay assembly, the controller being configured to:

activate the power-semiconductor circuit to conduct electrical current through the auxiliary breaker path, in response to a command signal to stop transfer of the electrical power between the input port and the output port, in order to provide a zero voltage condition under which the first mechanical relay is to deactivate;

deactivate the first mechanical relay when electrical current is being conducted through the auxiliary breaker path; and deactivate the power-semiconductor circuit after the first mechanical relay is deactivated so as to stop the transfer of the electrical power between the input port and the output port.

2. The DC circuit breaker of claim 1 wherein the auxiliary relay assembly further includes an auxiliary mechanical relay in the auxiliary breaker path, the auxiliary mechanical relay being arranged in series with the power-semiconductor circuit.

3. The DC circuit breaker of claim 2 wherein the controller is configured to activate the auxiliary mechanical relay to conduct electrical current before activating the power-semiconductor circuit in response to the command signal to stop transfer of the electrical power between the input port and the output port.

4. The DC circuit breaker of claim 2 wherein the controller is configured to deactivate the auxiliary mechanical relay after the power-semiconductor circuit is deactivated such that the auxiliary mechanical relay is deactivatable under a zero current condition.

5. The DC circuit breaker of claim 1 wherein the controller is configured to deactivate the second relay in the second supply line after deactivating the power-semiconductor circuit such that the second relay in the second supply line is deactivatable under a zero current condition.

6. The DC circuit breaker of claim 1 wherein the mechanical relays are alternating current (AC) mechanical relays.

7. The DC circuit breaker of claim 1 wherein the pair of MOSFET power-semiconductor switches have a maximum voltage rating greater than or equal to a peak voltage formed across the power-semiconductor circuit during deactivation of the power-semiconductor circuit following deactivation of the first mechanical relay by the controller.

8. The DC circuit breaker of claim 1 further including:
a supply-line current sensor along the first supply line arranged in series with a parallel configuration of the first mechanical relay and the auxiliary relay assembly for measuring electrical current through the first supply line;
an auxiliary-path current sensor along the auxiliary breaker path for measuring electrical current through the auxiliary breaker path;
wherein the controller is operatively communicated with the supply-line and auxiliary-path current sensors such that the controller is configured to deactivate the power-semiconductor circuit when the measured current in the auxiliary breaker path is substantially equal to the measured current in the first supply line.

9. The DC circuit breaker of claim 4 further including:
a supply-line current sensor along the first supply line arranged in series with a parallel configuration of the first mechanical relay and the auxiliary relay assembly for measuring electrical current through the first supply line;
an auxiliary-path current sensor along the auxiliary breaker path for measuring electrical current through the auxiliary breaker path;
wherein the controller is operatively communicated with the supply-line and auxiliary-path current sensors such that the controller is configured to deactivate the auxiliary mechanical relay when the measured current in the auxiliary breaker path is substantially equal to zero.

10. The DC circuit breaker of claim 5 further including:
a supply-line current sensor along the first supply line arranged in series with a parallel configuration of the first mechanical relay and the auxiliary relay assembly for measuring electrical current through the first supply line;
an auxiliary-path current sensor along the auxiliary breaker path for measuring electrical current through the auxiliary breaker path;
wherein the controller is operatively communicated with the supply-line and auxiliary-path current sensors such that the controller is configured to deactivate the second relay in the second supply line when the measured current in the first supply line is substantially equal to zero.

11. A method of operating the low voltage direct current (DC) circuit breaker of claim 1 in series between a source and a load, comprising:
after receiving the command signal to stop transfer of electrical power between the source and the load, deactivating the first mechanical relay in the first supply line of the low voltage DC circuit breaker so as to transfer electrical current to the auxiliary breaker path and conductively through the power-semiconductor circuit in an active state thereof;
after the first mechanical relay is deactivated, deactivating the power-semiconductor circuit in the auxiliary breaker path so as to stop transfer of electrical power.

12. The method of claim 11 wherein, after receiving said command signal but before deactivating the first mechanical relay, the power-semiconductor circuit in the auxiliary breaker path is activated from a previously inactive state in which the power-semiconductor circuit is not conductive.

13. The method of claim 11 further including, after the power-semiconductor circuit is deactivated, deactivating an auxiliary mechanical relay in the auxiliary breaker path so as to mechanically electrically isolate the source from the load along the first supply line.

14. The method of claim 13 wherein the auxiliary mechanical relay is deactivated when the electrical current in the alternate path is substantially equal to zero.

15. The method of claim 11 further including, after the power-semiconductor circuit is deactivated, deactivating the second mechanical relay in the second supply line so as to mechanically electrically isolate the source from the load along the second supply line.

16. The method of claim 15 wherein the second mechanical relay in the second supply line is deactivated when the electrical current in the first supply line is substantially equal to zero.

17. The method of claim 11 wherein the power-semiconductor circuit is deactivated when the electrical current in the auxiliary breaker path is substantially equal to the total electrical current through the first supply line.

18. The method of claim 11 further including:
prior to transfer of electrical power commencing between the source and the load, activating the power-semiconductor circuit while the first mechanical relay is in an inactive state to begin transfer of the electrical power between the source and the load; and
when electrical current conducted through the DC circuit breaker has reached steady state:

activating the first mechanical relay to conduct current in parallel with the power-semiconductor circuit; and
deactivating the power-semiconductor circuit so that the steady-state electrical current continues to be conducted along the first supply line by the first mechanical relay only.

\* \* \* \* \*